US006544313B2

(12) United States Patent
Peacock et al.

(10) Patent No.: US 6,544,313 B2
(45) Date of Patent: Apr. 8, 2003

(54) SULFUR-CONTAINING FERTILIZER COMPOSITION AND METHOD FOR PREPARING SAME

(75) Inventors: Lawrence Alan Peacock, Minnetonka, MN (US); Arthur Ray Shirley, Jr., Florence, AL (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 09/859,216

(22) Filed: May 16, 2001

(65) Prior Publication Data

US 2002/0011088 A1 Jan. 31, 2002

Related U.S. Application Data

(60) Provisional application No. 60/204,970, filed on May 17, 2000.

(51) Int. Cl.$^7$ .................................................. C05C 9/00
(52) U.S. Cl. ........................ 71/28; 71/33; 71/36; 71/58; 71/61; 71/64.07; 71/64.11; 71/64.13
(58) Field of Search ........................ 71/28, 33, 36, 71/58, 61, 64.07, 64.11, 64.13

(56) References Cited

U.S. PATENT DOCUMENTS

| 3,903,333 | A |   | 9/1975  | Shirley, Jr. et al. ........ 427/212 |
|-----------|---|---|---------|--------------------------------------|
| 4,015,972 | A |   | 4/1977  | Watkins et al. ................. 71/31 |
| 4,032,319 | A |   | 6/1977  | Smith et al. .................... 71/34 |
| 4,081,264 | A |   | 3/1978  | Ali .................................. 71/28 |
| 4,330,319 | A |   | 5/1982  | Bexton et al. ................. 71/28 |
| 4,334,906 | A |   | 6/1982  | Young ............................ 71/33 |
| 4,547,213 | A |   | 10/1985 | Stoller ............................ 71/53 |
| 4,857,098 | A |   | 8/1989  | Shirley, Jr. ..................... 71/28 |
| 4,881,963 | A |   | 11/1989 | Fujita et al. ................ 71/64.07 |
| 5,112,379 | A |   | 5/1992  | Young ............................ 71/31 |
| 5,152,821 | A | * | 10/1992 | Walter ............................ 71/33 |
| 5,158,594 | A |   | 10/1992 | Oxford ........................... 71/25 |
| 5,176,734 | A |   | 1/1993  | Fujita et al. .................... 71/11 |
| 5,405,426 | A |   | 4/1995  | Timmons et al. .............. 71/28 |
| 5,460,765 | A |   | 10/1995 | Derdall et al. ............. 264/117 |
| 5,466,274 | A |   | 11/1995 | Hudson et al. ................. 71/28 |
| 5,571,303 | A |   | 11/1996 | Bexton ........................... 71/34 |
| 5,599,374 | A |   | 2/1997  | Detrick ........................... 71/28 |
| 5,984,994 | A |   | 11/1999 | Hudson .......................... 71/28 |
| 6,013,209 | A |   | 1/2000  | Phinney ................... 264/37.29 |

* cited by examiner

Primary Examiner—Chhaya D. Sayala
(74) Attorney, Agent, or Firm—Jeffrey J. Skelton

(57) ABSTRACT

A fertilizer composition that includes a plurality of particles in which the particles feature a plurality of sulfur platelets embedded within a fertilizer portion, and a method for preparing this composition in which fertilizer-containing particles are sprayed first with a sulfur spray, and then with a slurry containing fertilizer or a precursor thereof, followed by curing.

48 Claims, 1 Drawing Sheet

SULFUR-CONTAINING FERTILIZER COMPOSITION AND METHOD FOR PREPARING SAME

This application claims priority from Provisional Application No. 60/204,970 filed May 17, 2000, the contents of which are hereby incorporated by reference.

BACKGROUND

This invention relates to delivering sulfur to soil to support plant growth.

Sulfur, when oxidized to its sulfate form, is an essential nutrient for plant growth. To provide the sulfur in a form suitable for application to soil, the sulfur is typically bulk blended with granular fertilizers such as phosphates, nitrates, ureas, and/or potashes to form a physical blend. This blend is then applied to soil by various means such as broadcasting or banding to supply the soil with sulfur, as well as additional nutrients found in the granular fertilizers.

One problem with such blends is that they undergo size segregation during handling and transportation as the particles settle, resulting in smaller particles and dust concentrating near the bottom of the bulk blend. Consequently, sulfur is not uniformly distributed throughout the blend, resulting in uneven sulfur dosage when the blend is applied to soil. For example, some treated areas may receive too much sulfur, whereas others may receive too little sulfur. There is a need, therefore, for a vehicle that delivers sulfur uniformly to soil.

Sulfur has also been incorporated in fertilizer compositions for a different purpose. Specifically, sulfur has been used in the manufacture of slow release fertilizer compositions as a relatively thick outer coating or shell firmly anchored to the surface of fertilizer particles. In such compositions, the objective is to provide slow release of the underlying fertilizer to the soil, not the delivery of sulfur to the soil for subsequent oxidation and plant utilization.

SUMMARY

The invention provides a vehicle for delivering sulfur to soil that avoids the problem of uneven sulfur distribution associated with bulk blended compositions. Specifically, the invention features a fertilizer composition having a plurality of particles in which the particles include a fertilizer portion and a plurality of discrete sulfur platelets embedded within the fertilizer portion.

As used herein, a "discrete sulfur platelet" refers to a thin, discontinuous, sulfur fragment that may be substantially planar or substantially curved. For example, the platelet may be in the form of a partial sphere. Such platelets are in contrast to the relatively thick sulfur coatings and shells found in slow release fertilizer compositions that substantially cover the surface of the underlying fertilizer portion.

Examples of suitable fertilizer portions include phosphates (e.g., monoammonium phosphate, diammonium phosphate, single superphosphate, triple superphosphate, etc.), nitrates, ureas, potashes, and combinations thereof. The particles may also include one or more sulfates (e.g., calcium sulfate, magnesium sulfate, ammonium sulfate, and combinations thereof), one or more micronutrients (e.g., zinc, manganese, iron, copper, molybdenum, boron, chloride, cobalt, sodium, and combinations thereof), and/or one or more secondary nutrients (e.g., calcium, magnesium, and combinations thereof). The total elemental sulfur content of the particles preferably is no greater than about 20% by weight, more preferably no greater than about 10% by weight, and even more preferably no greater than about 5% by weight.

Upon application to soil, the sulfur platelets are released to the soil, along with the components of the fertilizer portion, and are oxidized to the sulfate form by soil microbial activity. Oxidation is facilitated by forming the platelets such that they have thicknesses no greater than about 100 microns, preferably no greater than about 10 microns. Because each particle in the composition contains sulfur platelets, the problem of uneven sulfur application is avoided, even if the particles undergo settling. Moreover, by embedding the sulfur platelets in the fertilizer portion, rather than providing sulfur solely as a firmly anchored coating over the outermost surface of the fertilizer particles, the particles provide a convenient vehicle for delivering both the sulfur and fertilizer components to the soil simultaneously.

The fertilizer composition is prepared according to a process that includes spraying a plurality of fertilizer-containing particles first with elemental sulfur and then with a slurry that contains fertilizer, or a precursor thereof, and thereafter curing the resulting sulfur-containing particles. The curing process may take a number of forms depending upon the composition of the slurry. For example, in the case of slurries containing a monoammonium or diammonium phosphate fertilizer precursor, the curing step includes sparging the sulfur-containing particles with ammonia and thereafter drying the particles to form particles in which sulfur platelets are embedded within monoammonium or diammonium phosphate fertilizer. On the other hand, where the slurry contains single super phosphate, triple superphosphate, urea, or potash, the ammonia sparge is not necessary and the particles are cured simply by drying.

The fertilizer slurry typically is a molten composition. If the slurry were deposited first, followed by sulfur, or if sulfur and the slurry were deposited simultaneously, areas of sulfur deposited on top of the molten slurry would have a tendency to flake off the particle. Spraying the particles first with sulfur and then with the fertilizer slurry avoids this problem. The molten slurry is deposited over the sulfur platelets but more strongly adheres to portions of the underlying fertilizer particle, rather than the sulfur platelets. Thus, both the fertilizer and the sulfur platelets remain in place, yet can be released at the appropriate time into soil.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
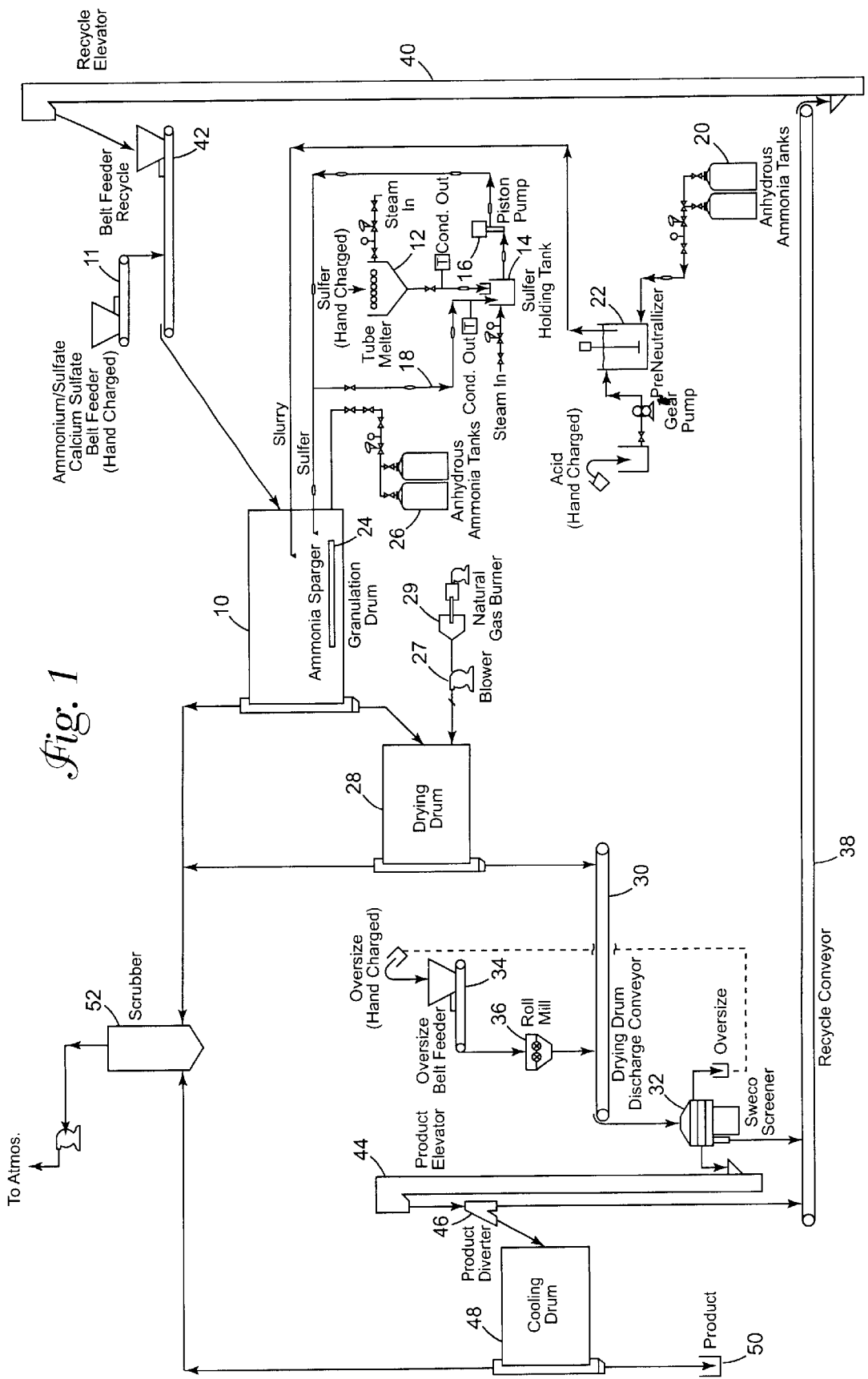
FIG. 1 is a schematic drawing showing one embodiment of a process for preparing a sulfur-containing fertilizer composition.

Referring to FIG. 1, there is shown a continuous process for preparing a fertilizer composition featuring particles having discrete sulfur platelets embedded within a fertilizer portion in which the fertilizer portion is monoammonium phosphate ("MAP"), diammonium phosphate ("DAP"), or a combination thereof. As shown in FIG. 1, a rotatable granulation drum reactor 10 containing MAP or DAP fertilizer granules (or combination thereof) rotates to form a rolling bed of fertilizer granules. Reactor 10 further contains solid sulfates (e.g., calcium sulfate, magnesium sulfate, ammonium sulfate, or combination thereof) fed to the reactor from belt feeder 11. These sulfates, which are incorporated into the final product, are immediately available for plant sulfur nutrition when the final product is applied to soil. In contrast, the elemental sulfur in the platelets must first be oxidized to the sulfate form by soil microorganisms before it is available for plant sulfur nutrition.

As reactor 10 rotates, the reactor contents are first sprayed with elemental sulfur in the form of a molten, low pressure spray to form thin sulfur platelets on the surface of the fertilizer granules. Because the fertilizer granules are not molten, the sulfur platelets do not flake off the granules. Spraying conditions, including spray pressure and spraying time, are selected such that the sulfur platelets do not cover the entire surface of the fertilizer granules to facilitate adhesion of a subsequently applied slurry to the underlying fertilizer granules.

The molten sulfur spray is prepared by hand charging elemental sulfur to a tube melter 12 where the sulfur is melted using steam supplied to melter 12. The molten sulfur is stored in a holding tank 14, also supplied with steam, until needed, whereupon it is pumped via pump 16 to reactor 10 and atomized to form a spray. A return loop 18 is used to meter the amount of molten sulfur delivered to reactor 10 by returning excess molten sulfur to holding tank 14.

Following formation of the sulfur platelets, the still-rotating, platelet-bearing fertilizer granules are sprayed with a molten slurry prepared by combining ammonia (from tanks 20) and phosphoric acid in a pre-neutralizer 22, and then transferring the slurry to reactor 10 where it is atomized to form a spray. The slurry is a fertilizer precursor that is transformed into MAP, DAP, or a combination thereof upon ammonia sparging. It more strongly adheres to portions of the surface of fertilizer granules not occupied by sulfur platelets, and extends over, but does not strongly adhere to, the sulfur platelets. The slurry spraying conditions, including spray pressure and spraying time, are selected based upon the desired thickness of fertilizer following ammonia sparging.

As noted above, once slurry spraying is complete, the coated particles are subjected to an ammonia sparge to convert the slurry to MAP, DAP, or a combination thereof. An under-bed ammonia sparger 24, supplied with ammonia from tanks 26, is used for this purpose. The concentration of ammonia is selected to achieve a nitrogen to phosphate ratio of about 1.0 (in the case of MAP) or about 2.0 (in the case of DAP), at which point insoluble fertilizer particles form and precipitate out of solution. The net result is a particle in which thin, sulfur platelets are embedded in MAP, DAP, or a combination thereof.

Following the ammonia sparge, the thus-formed particles are dried in a heated drying drum 28 to remove moisture and any other volatile material using heat supplied from a natural gas burner 29 through a blower 27. Following drying, the particles are discharged via conveyor 30 to a particle screener 32 equipped with one or more particle sizing screens. Particle screener 32 separates particles that are too large and too small, relative to a pre-determined target size, from the product stream. The oversize particles are charged to a belt feeder 34 and then fed to a roll mill 36. Roll mill 36 gently grinds the oversize particles, taking care to minimize dust formation, to reduce their size. The ground particles are then recycled via recycle conveyor 38 and recycle elevator 40, and fed via belt feeder recycle 42, back to reactor 10 where they are combined with additional sulfate and undergo another round of exposure to the sulfur spray, followed by the slurry spray, until the desired particle size is obtained. Particle screener 32 likewise supplies undersize particles to recycle conveyor 38 where they join the oversize particles and form the raw material for reactor 10.

Following separation of the oversize and undersize particles, the resulting product stream, which contains particles satisfying the pre-determined target size, is transported, via product elevator 44 to a product diverter 46 that recycles a portion of these particles back to reactor 10 and feeds the remaining particles to cooling drum 48. The cooled particles are then collected and stored in a collector 50. Any volatiles emitted during the cooling process, as well as volatiles emitted from drying drum 28 and reactor 10, are fed to a scrubber 52 where they are treated and then vented to the atmosphere.

The particles formed according to the above-described process feature a MAP or DAP fertilizer portion (or combination thereof) and thin, sulfur platelets embedded within the fertilizer portion. The platelet thickness is preferably less than 100 microns, more preferably, less than 10 microns, to facilitate oxidation of the sulfur to sulfate upon application to soil. The total elemental sulfur content preferably is no greater than about 20% by weight, more preferably no greater about 10% by weight, and even more preferably no greater than about 5% by weight.

In the case of particles that further include sulfate (e.g., calcium sulfate, magnesium sulfate, ammonium sulfate, or a combination thereof), the ratio of sulfate sulfur to elemental sulfur in the particle, on a weight to weight basis, is selected based upon agronomic needs for a given crop and/or crop area. In general, sulfate sulfur to elemental sulfur ratios ranging from about 1:9 to about 7:3 are suitable, with ratios of about 1:1 being particularly useful.

The overall size of the particles is selected to permit optimum release of nutrients upon application to soil. In general, particle size ranges from about 2 mm in diameter to about 4 mm in diameter.

The process shown in FIG. 1 illustrates an embodiment in which the fertilizer portion is MAP, DAP, or a combination thereof. However, other fertilizers may be used as well, including, for example, other phosphates (e.g., single superphosphate, triple superphosphate, or combination thereof), nitrates, ureas, potashes, and combinations thereof. Not all of these fertilizers will require an ammonia sparge. For example, in the case of single superphosphate, triple superphosphate, ureas, and potashes, an ammonia sparge is not needed to convert the slurry to fertilizer, nor is a pre-neutralizer necessary. Rather, a slurry containing the fertilizer is applied to the particles in reactor 10, followed by drying in drying drum 28, to form the product.

In addition, FIG. 1 illustrates the use of a reactor in the form of a rotating granulation drum. However, other reactors may be used as well, including, for example, a fluidized bed reactor.

FIG. 1 also illustrates a continuous process for preparing the sulfur-containing fertilizer particles. Nevertheless, batch processes may be used as well.

The process shown in FIG. 1 further illustrates incorporating sulfates in the particles through addition of solid sulfates. However, sulfate incorporation may be accomplished via different routes. For example, the sulfate may be generated in situ, by reacting sulfuric acid dissolved in the phosphoric acid feed with the appropriate cation.

Other ingredients may be added to the particles. Examples include micronutrients (e.g., zinc, manganese, iron, copper, molybdenum, boron, chloride, cobalt, sodium, and combinations thereof), and secondary nutrients (e.g., calcium, magnesium, and combinations thereof). The micronutrients and secondary nutrients may be supplied in elemental form or in the form of salts (e.g., sulfates, nitrates, halides, etc.).

It is also possible, following particle formation, to apply one or more encapsulating coatings to the particles. Examples of suitable encapsulating coatings are known in the art and include, for example, polymeric coatings that degrade over time following application to soil.

A number of embodiments of the invention have been described. Nevertheless, it will be understood that various modifications may be made without departing from the spirit and scope of the invention. Accordingly, other embodiments are within the scope of the following claims.

What is claimed is:

1. A fertilizer composition comprising a plurality of particles, wherein said particles comprise:
    (a) a fertilizer portion; and
    (b) a plurality of discrete sulfur platelets embedded within said fertilizer portion.

2. A fertilizer composition according to claim 1 wherein said platelets have a thickness no greater than about 100 microns.

3. A fertilizer composition according to claim 1 wherein said platelets have a thickness no greater than about 10 microns.

4. A fertilizer composition according to claim 1 wherein said fertilizer portion is selected from the group consisting of phosphates, nitrates, ureas, potashes, and combinations thereof.

5. A fertilizer composition according to claim 1 wherein said fertilizer portion is selected from the group consisting of monoammonium phosphate, diammonium phosphate, single superphosphate, triple superphosphate, and combinations thereof.

6. A fertilizer composition according to claim 1 wherein said fertilizer portion comprises monoammonium phosphate.

7. A fertilizer composition according to claim 1 wherein said fertilizer portion comprises diammonium phosphate.

8. A fertilizer composition according to claim 1 wherein said fertilizer portion comprises single superphosphate.

9. A fertilizer composition according to claim 1 wherein said fertilizer portion comprises triple superphosphate.

10. A fertilizer composition according to claim 1 wherein the total elemental sulfur content of said particles is no greater than about 20% by weight.

11. A fertilizer composition according to claim 1 wherein the total elemental sulfur content of said particles is no greater than about 10% by weight.

12. A fertilizer composition according to claim 1 wherein the total elemental sulfur content of said particles is no greater than about 5% by weight.

13. A fertilizer composition according to claim 1 wherein said particles further comprise a sulfate.

14. A fertilizer composition according to claim 13 wherein said sulfate is selected from the group consisting of calcium sulfate, magnesium sulfate, ammonium sulfate, and combinations thereof.

15. A fertilizer composition according to claim 1 wherein said particles further comprise a micronutrient selected from the group consisting of zinc, manganese, iron, copper, molybdenum, boron, chloride, cobalt, sodium, and combinations thereof.

16. A fertilizer composition according to claim 1 wherein said particles further comprises a secondary nutrient selected from the group consisting of calcium, magnesium, and combinations thereof.

17. A method for preparing a fertilizer composition comprising:
    (A) spraying a first plurality of particles comprising a fertilizer with (a) elemental sulfur and then (b) a slurry comprising a fertilizer or precursor thereof; and
    (B) curing the product of step (A) to form a second plurality of particles comprising (i) a fertilizer portion and (ii) a plurality of discrete sulfur platelets embedded within said fertilizer portion.

18. A method according to claim 17 wherein said second plurality of particles comprises a fertilizer portion selected from the group consisting of phosphates, nitrates, ureas, potashes, and combinations thereof.

19. A method according to claim 17 wherein said second plurality of particles comprises a fertilizer portion selected from the group consisting of monoammonium phosphate, diammonium phosphate, single superphosphate, triple superphosphate, and combinations thereof.

20. A method according to claim 17 wherein said slurry comprises a monoammonium phosphate precursor and said curing step comprises sparging the product of step (A) with ammonia and drying the ammonia-sparged product to form said second plurality of particles comprising a fertilizer portion comprising monoammonium phosphate.

21. A method according to claim 17 wherein said slurry comprises a diammonium phosphate precursor and said curing step comprises sparging the product of step (A) with ammonia and drying the ammonia-sparged product to form said second plurality of particles comprising a fertilizer portion comprising diammonium phosphate.

22. A method according to claim 17 wherein said slurry comprises single superphosphate and said curing step comprises drying the product of step (A) to form said second plurality of particles comprising a fertilizer portion comprising single superphosphate.

23. A method according to claim 17 wherein said slurry comprises triple superphosphate and said curing step comprises drying the product of step (A) to form said second plurality of particles comprising a fertilizer portion comprising triple superphosphate.

24. A method according to claim 17 wherein said first plurality of particles, said slurry, or both further comprise a sulfate.

25. A method according to claim 24 wherein said sulfate is selected from the group consisting of calcium sulfate, magnesium sulfate, ammonium sulfate, and combinations thereof.

26. A method according to claim 17 wherein said first plurality of particles, said slurry, or both further comprises a micronutrient selected from the group consisting of zinc, manganese, iron, copper, molybdenum, boron, chloride, cobalt, sodium, and combinations thereof.

27. A method according to claim 17 wherein said first plurality of particles, said slurry, or both further comprise a secondary nutrient selected from the group consisting of calcium, magnesium, and combinations thereof.

28. A method according to claim 17 wherein said platelets have a thickness no greater than about 100 microns.

29. A method according to claim 17 wherein said platelets have a thickness no greater than about 10 microns.

30. A method according to claim 17 wherein said second plurality of particles has a total elemental sulfur content no greater than about 20% by weight.

31. A method according to claim 17 wherein said second plurality of particles has a total elemental sulfur content no greater than about 10% by weight.

32. A method according to claim 17 wherein said second plurality of particles has a total elemental sulfur content no greater than about 5% by weight.

33. A method for delivering sulfur to soil comprising treating the soil with a fertilizer composition comprising a plurality of particles,
wherein said particles comprise (a) a fertilizer portion and (b) a plurality of discrete sulfur platelets embedded within said fertilizer portion.

34. A method according to claim 33 wherein said platelets have a thickness no greater than about 100 microns.

35. A method according to claim 33 wherein said platelets have a thickness no greater than about 10 microns.

36. A method according to claim 33 wherein said fertilizer portion is selected from the group consisting of phosphates, nitrates, ureas, potashes, and combinations thereof.

37. A method according to claim 33 wherein said fertilizer portion is selected from the group consisting of monoammonium phosphate, diammonium phosphate, single superphosphate, triple superphosphate, and combinations thereof.

38. A method according to claim 33 wherein said fertilizer portion comprises monoammonium phosphate.

39. A method according to claim 33 wherein said fertilizer portion comprises diammonium phosphate.

40. A method according to claim 33 wherein said fertilizer portion comprises single superphosphate.

41. A method according to claim 33 wherein said fertilizer portion comprises triple superphosphate.

42. A method according to claim 33 wherein the total elemental sulfur content of said particles is no greater than about 20% by weight.

43. A method according to claim 33 wherein the total elemental sulfur content of said particles is no greater than about 10% by weight.

44. A method according to claim 33 wherein the total elemental sulfur content of said particles is no greater than about 5% by weight.

45. A method according to claim 33 wherein said particles further comprise a sulfate.

46. A method according to claim 45 wherein said sulfate is selected from the group consisting of calcium sulfate, magnesium sulfate, ammonium sulfate, and combinations thereof.

47. A method according to claim 33 wherein said particles further comprise a micronutrient selected from the group consisting of zinc, manganese, iron, copper, molybdenum, boron, chloride, cobalt, sodium, and combinations thereof.

48. A method according to claim 33 wherein said particles further comprise a secondary nutrient selected from the group consisting of calcium, magnesium, and combinations thereof.

* * * * *